United States Patent
Akkarakaran et al.

(10) Patent No.: US 11,523,354 B2
(45) Date of Patent: Dec. 6, 2022

(54) SYNCHRONIZATION SIGNAL FOR SIDELINK

(71) Applicant: QUALCOMM Incorporated, San Diego, CA (US)

(72) Inventors: Sony Akkarakaran, Poway, CA (US); Mahmoud Taherzadeh Boroujeni, San Diego, CA (US); Tao Luo, San Diego, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 16/992,700

(22) Filed: Aug. 13, 2020

(65) Prior Publication Data

US 2021/0051610 A1    Feb. 18, 2021

Related U.S. Application Data

(60) Provisional application No. 62/886,783, filed on Aug. 14, 2019.

(51) Int. Cl.
*H04W 56/00* (2009.01)

(52) U.S. Cl.
CPC .................... *H04W 56/00* (2013.01)

(58) Field of Classification Search
CPC .................... H04W 56/00; H04W 56/0025
See application file for complete search history.

(56) References Cited

U.S. PATENT DOCUMENTS

| | | | | |
|---|---|---|---|---|
| 9,893,855 | B2* | 2/2018 | Kim | H04L 27/2657 |
| 10,341,968 | B2* | 7/2019 | Xiong | H04W 8/005 |
| 10,342,019 | B2* | 7/2019 | Xue | H04W 76/14 |
| 11,197,303 | B2* | 12/2021 | Wu | H04W 56/00 |
| 11,228,993 | B2* | 1/2022 | Wang | H04W 56/0015 |
| 2020/0015214 | A1* | 1/2020 | Si | H04W 72/044 |
| 2020/0351705 | A1* | 11/2020 | Chae | H04W 72/042 |
| 2020/0351859 | A1* | 11/2020 | Chae | H04W 72/0406 |
| 2021/0051641 | A1* | 2/2021 | Si | H04W 72/02 |

(Continued)

FOREIGN PATENT DOCUMENTS

| | | | | |
|---|---|---|---|---|
| WO | WO-2020033759 A1 * | 2/2020 | | H04B 17/318 |
| WO | WO-2020048514 A1 * | 3/2020 | | H04L 5/0048 |
| WO | WO-2021002736 A1 * | 1/2021 | | H04L 1/16 |

OTHER PUBLICATIONS

Partial International Search Report and Provisional Written Opinion dated Nov. 20, 2020 from corresponding PCT Application No. PCT/US2020/046544.

(Continued)

*Primary Examiner* — Ahmed Elallam
(74) *Attorney, Agent, or Firm* — Danai Nelisile Mhembere; ArentFox Schiff LLP

(57) ABSTRACT

Sidelink synchronization facilitates providing timing reference for sidelink communications, including the transmitting of sidelink messages and/or the receiving of sidelink messages. Receive beams and transmission beams may change due to a change in the position and/or orientation of the transmitting wireless device. An apparatus for wireless communication at a wireless device determines a variable duration for a SLSS. The apparatus transmits the SLSS using the variable duration determined by the wireless device.

56 Claims, 11 Drawing Sheets

(56) References Cited

U.S. PATENT DOCUMENTS

2021/0235403 A1* 7/2021 Lee .................. H04W 56/0015
2021/0314796 A1* 10/2021 Hoang ................. H04W 24/08
2021/0321348 A1* 10/2021 Ohara .................. H04L 5/0048

OTHER PUBLICATIONS

Intel Corporation: "Synchronization Design for NR V2X Sidelink Conmunication", 3GPP Draft; RI-1906797 Intel—EV2X SL Sync, 3rd Generation Partnership Project (3GPP), Mobile Competence Centre; 650, Route Des Lucioles; F-06921 Sophia-Antipolis Cedex; France; vol. RAN WG1, no. Reno, USA; May 13, 2019-May 17, 2019 May 4, 2019 (May 4, 2019), XP051708833, Retrieved from the Internet: URL:http://www.3gpp.org/ftp/tsg%5Fran/WG1%5FRL1/TSGR1%5F97/Docs/R1%2D1906797%2Ezip [retrieved on May 4, 2019].

CATT: "Design and evaluation of S-SSB for NR V2X Sidelink", 3GPP Draft; RI-1900322, 3rd Generation Partnership Project (3GPP), Mobile Competence Centre; 650, Route Des Lucioles ; F-06921 Sophia-Antipolis Cedex ; France; vol. RAN WGI, no. Taipei; Jan. 21, 2019-Jan. 25, 2019 Jan. 12, 2019 (Jan. 12, 2019), XP051575931, Retrieved from the Internet: URL:http://www.3gpp.org/ftp/tsg%5Fran/WG1%5FRL1/TSGR1%5FAH/NR%5FAH%5F1901/Docs/RI%2D1900322%2Ezip [retrieved on Jan. 12, 2019].

International Search Report and Written Opinion dated Jan. 26, 2021 from corresponding PCT Application No. PCT/US2020/046544, ISA/EPO, 18 pages.

* cited by examiner

SYNCHRONIZATION SIGNAL FOR SIDELINK

CROSS REFERENCE TO RELATED APPLICATIONS

This application claims the benefit of U.S. Provisional Application No. 62/886,783, entitled "VARIABLE DURATION SSB FOR SIDELINK" and filed on Aug. 14, 2019, which is expressly incorporated by reference herein in its entirety.

BACKGROUND

Technical Field

The present disclosure relates generally to communication systems, and more particularly, to wireless communication based on sidelink.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Sidelink synchronization facilitates providing timing reference for sidelink communications, including the transmitting of sidelink messages and/or the receiving of sidelink messages. Sidelink synchronization signals (SLSS) are utilized for synchronization in time and frequency. An SLSS may include a sidelink primary synchronization signal (PSS), a sidelink secondary synchronization signal (SSS), or a physical broadcast channel (PBCH).

A User Equipment (UE) may be configured to act as a source of the SLSS. The UE may be instructed by the network to transmit the SLSS, the UE may decide on its own to transmit the SLSS while being covered by a cell, or the UE may send the SLSS when it is out of cell coverage. A UE may be configured to utilize beamforming to transmit the SLSS, which may allow the transmitting UE to account for distance coverage, but at the expense of angular coverage. However, the receive beam may change for the same transmission beam, for example, due to a change in the position and/or orientation of the transmitting UE. Aspects presented herein provide a solution to the problem of the receive beam and/or transmission beam changing due to the changing in the position and/or orientation of the transmitting UE by utilizing variable durations for transmitting the SLSS. In some aspects, broader beams may be used to transmit the SLSS, which may compensate for a change of orientation of the transmitting UE.

In an aspect of the disclosure, a method, a computer-readable medium, and an apparatus are provided. An example apparatus for wireless communication at a wireless device determines a variable duration for a SLSS. The example apparatus transmits the SLSS using the variable duration determined by the wireless device.

In another aspect of the disclosure, a method, a computer-readable medium, and an apparatus are provided. An example apparatus for wireless communication at a wireless device searches for a first SLSS based on a first duration for an initial acquisition. The example apparatus searches for a second SLSS based on a second duration for a refinement. In some aspects, the first duration may be longer than the second duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
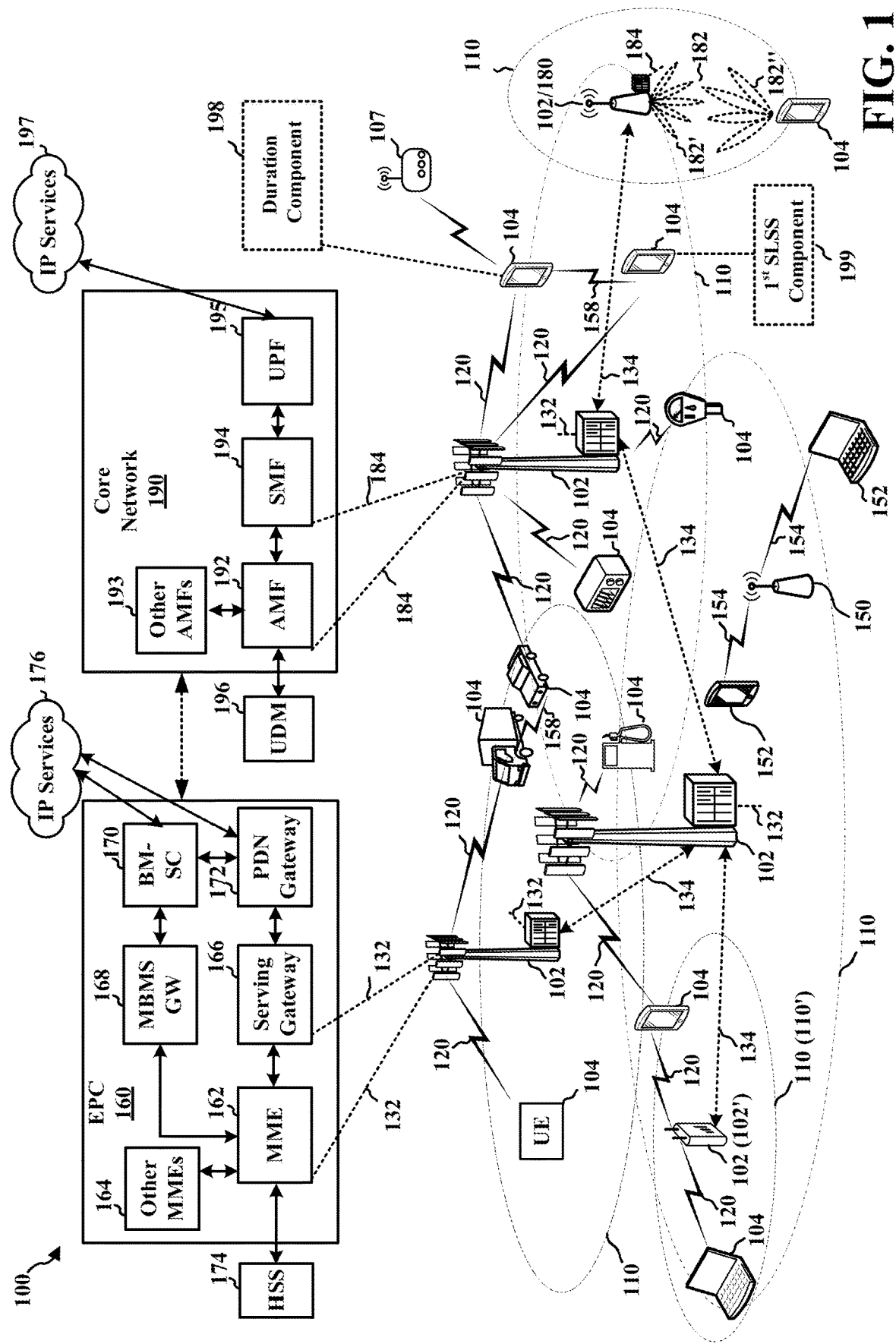
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum may boost coverage to and/or increase capacity of the access network. A base station 102, whether a small cell 102' or a large cell (e.g., macro base station), may include an eNB, gNodeB (gNB), or other type of base station. Some base stations 180, such as a gNB may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or a roadside unit (RSU) 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, a transmitting device, such as the UE 104, may comprise a duration component 198 configured to determine a variable duration for a SLSS. In some examples, the UE 104 may use a first duration for the SLSS on a first channel and use a second duration for the SLSS on a second channel. The example duration component 198 may also be configured to transmit the SLSS using the variable duration determined by the UE.

Referring again to FIG. 1, in certain aspects, a receiving device, such as the UE 104, may comprise a first SLSS component 199 configured to search for a first SLSS. In some examples, the UE 104 may search for the first SLSS based on a first duration for an initial acquisition. The UE 104 may be further configured to search for a second SLSS based on a second duration for a refinement, wherein the first duration is longer than the second duration.

Although the following description may be focused on variable durations for a SLSS for sidelink communications, the concepts described herein are similarly applicable to other similar areas, such as establishing an access link connection (e.g., between a UE and a base station). Furthermore, although the following description may be focused on 5G NR, the concepts described herein may be applicable to other similar areas, such as LTE, LTE-A, CDMA, GSM, and other wireless technologies in which a device may provide a timing reference signal for sidelink connections.

Figure 2:
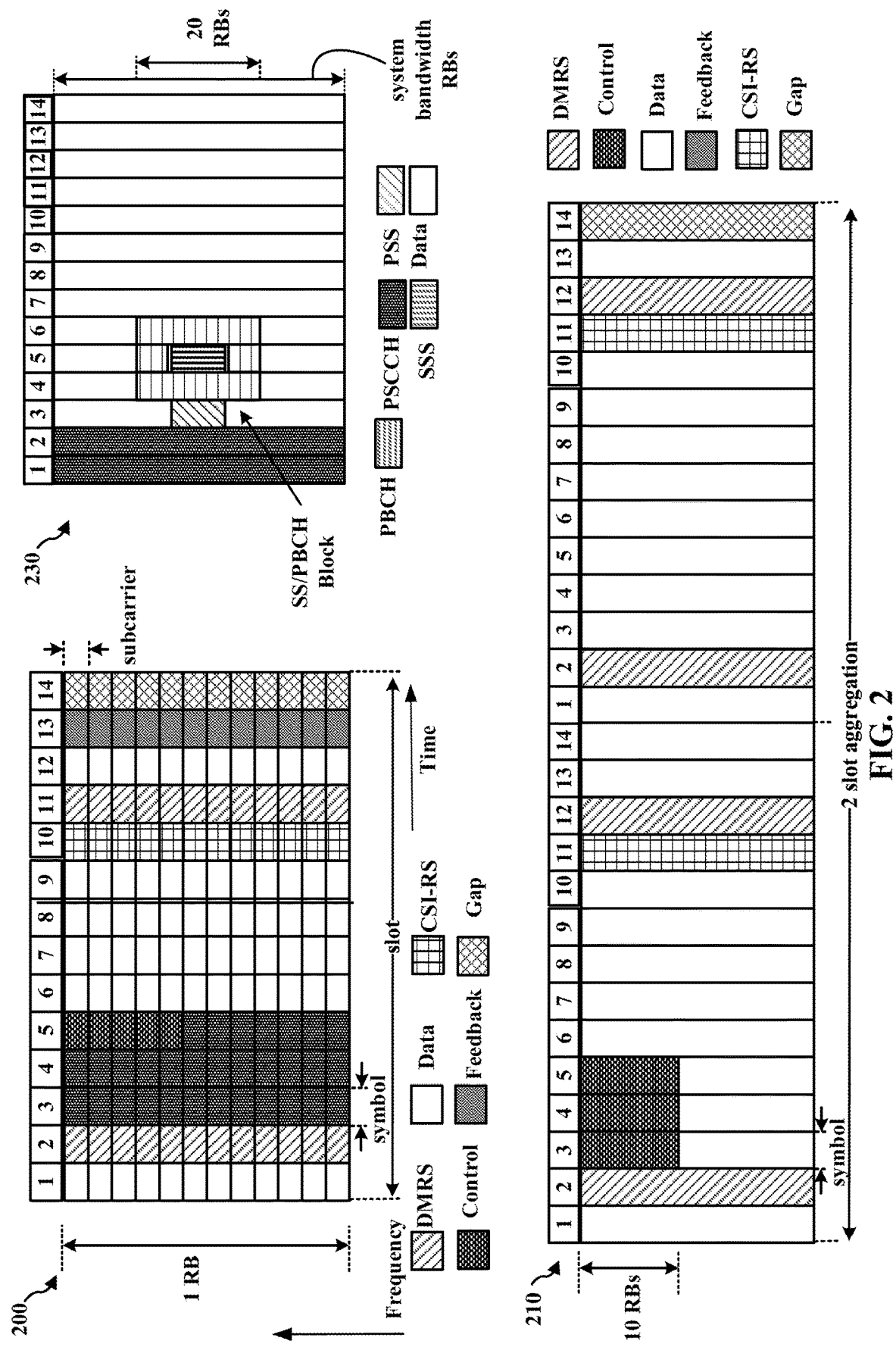
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise channel state information reference signals (CSI-RS). The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Diagram 230 illustrates an example of various sidelink channels within a slot structure. The physical sidelink control channel (PSCCH) carries DCI within one or more control channel elements (CCEs), each CCE including nine RE groups (REGs), each REG including four consecutive REs in an OFDM symbol. A sidelink primary synchronization signal (S-PSS) may be within symbol 2 of particular subframes of a frame. The S-PSS is used by a UE 104 to determine subframe/symbol timing and a physical layer identity. A sidelink secondary synchronization signal (S-SSS) may be within symbol 4 of particular subframes of a frame. The S-SSS is used by a UE to determine a physical layer cell identity group number and radio frame timing. Based on the PCI, the UE can determine the locations of the aforementioned DM-RS. The physical sidelink broadcast channel (PSBCH), which carries a master information block (MIB), may be logically grouped with the S-PSS and S-SSS to form a sidelink synchronization signal (SS)/PBCH block (S-SSB). The MIB provides a number of RBs in the system bandwidth and a system frame number (SFN). A data channel may carry user data, broadcast system information not transmitted through the PBCH such as system information blocks (SIBs), and paging messages.

Figure 3:
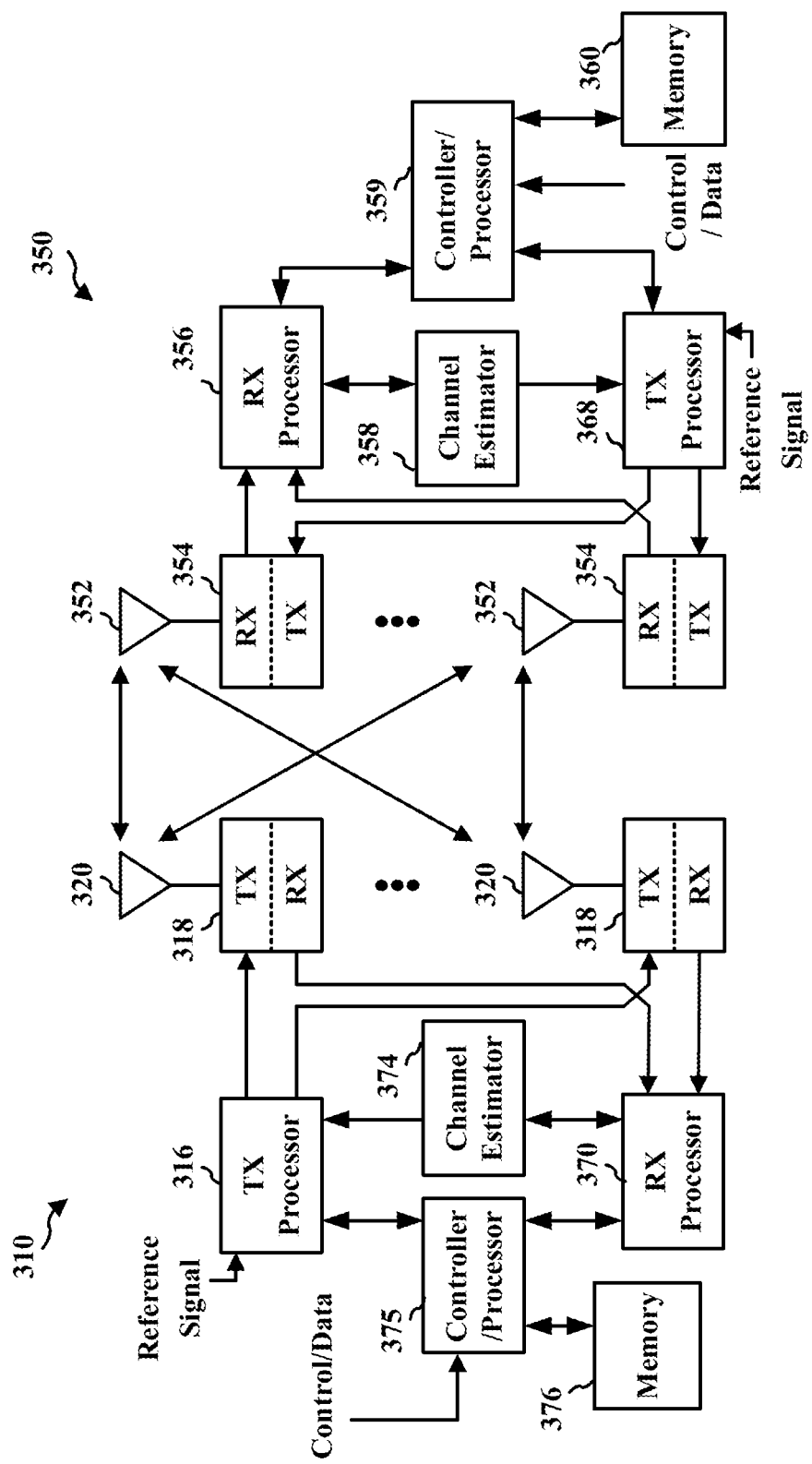
FIG. 3 is a diagram illustrating an example of a first device and a second device involved in wireless communication based, e.g., on V2V, V2X, and/or device-to-device communication.

FIG. 3 is a block diagram 300 of a device 310 configured for wireless communication with device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 of the device 310 may be configured to perform aspects described in connection with duration component 198 of FIG. 1 and/or the first SLSS component 199 of FIG. 1.

Figure 4:
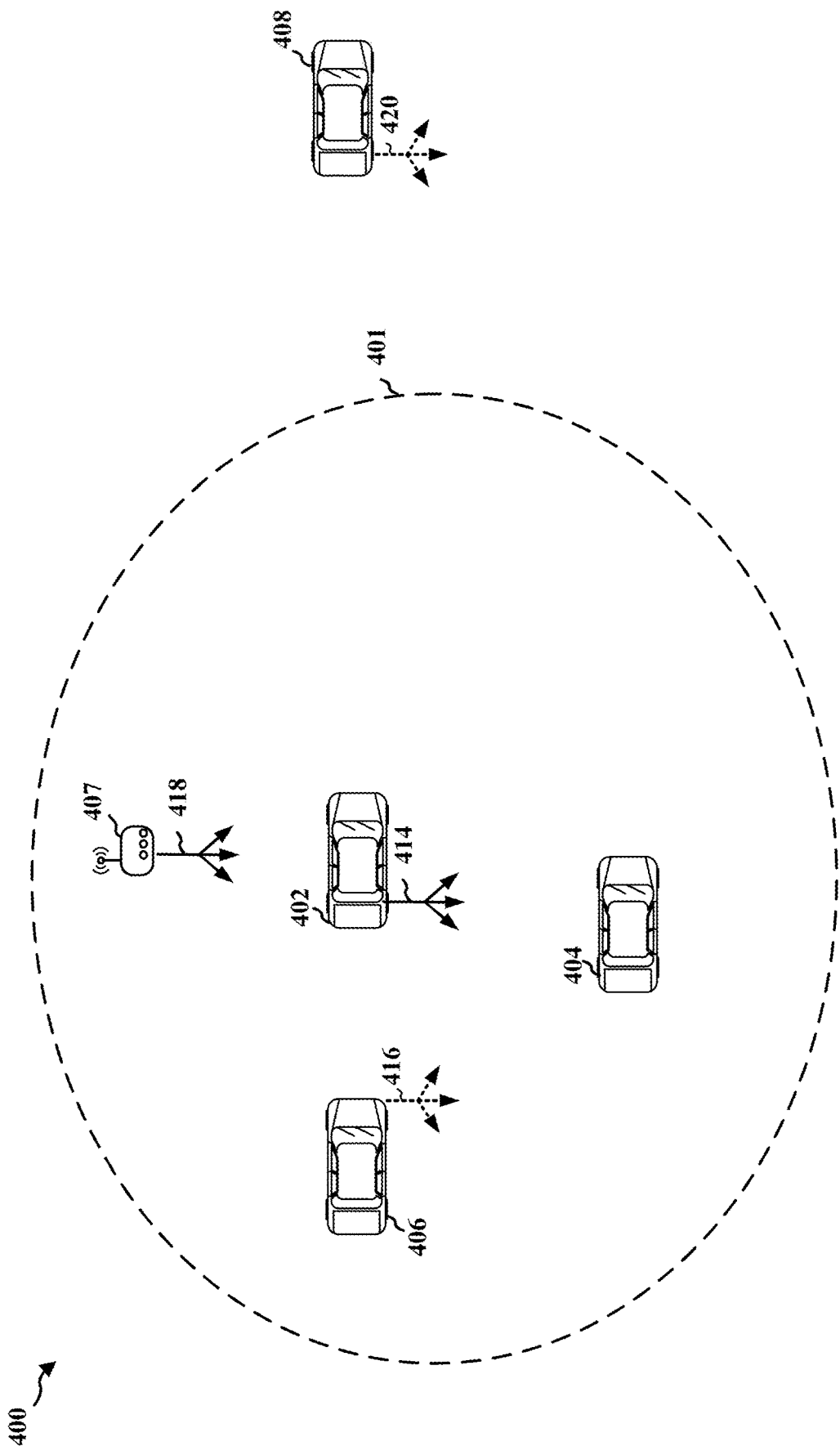
FIG. 4 illustrates an example of wireless communication between devices based on V2X/V2V/D2D communication.

FIG. 4 illustrates an example 400 of wireless communication between devices based on V2X/V2V/D2D communication. The communication may be based on a slot structure comprising aspects described in connection with FIG. 2. For example, UE 402 may transmit a transmission 414, e.g., comprising a control channel and/or a corresponding data channel, that may be received by UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting a transmissions 416, 420. The transmissions 414, 416, 420 may be broadcast or multicast to nearby devices. For example, UE 402 may transmit communication 414 intended for receipt by other UEs within a range 401 of UE 402. Additionally/alternatively, RSU 407 may receive communication from and/or transmit communication to UEs 402, 404, 406, 408.

UE 402, 404, 406, 408, or RSU 407 may comprise a duration component, similar to 198 described in connection with FIG. 1. Sidelink synchronization facilitates providing timing reference for sidelink communications, including the transmitting of sidelink messages and/or the receiving of sidelink messages. Sidelink synchronization signals (SLSS) are utilized for synchronization in time and frequency. An SLSS may include an S-PSS, an S-SSS, or a PSBCH.

A UE may be configured to act as a source of SLSS. The UE may be instructed by the network to transmit the SLSS, the UE may decide on its own to transmit the SLSS while being covered by a cell, or the UE may send the SLSS when it is out of cell coverage. A UE may be configured to utilize beamforming to transmit the SLSS, which may allow the transmitting UE to account for distance coverage, but at the expense of angular coverage. A base station may sweep over different beam directions to obtain full angular coverage of a sector or a cell. A UE may find an S-S-SSB beam from the base station, e.g., having a threshold strength. The UE may send random access messages, e.g., a physical random access channel (PRACH) on resources associates with the S-SSB beam. The UE may average a given S-SSB across multiple SS periods using the same reception beam, e.g., in order to select a beam for random access. Subsequent communication may be sent on the selected S-SSB beam, e.g., until further beam refinement is configured for the UE. A refinement may occur during a random access procedure, after a UE is in an RRC connected mode, based on a CSI-RS configuration, etc. However, the transmitting device and/or the receiving device may be mobile and may change position relative to each other. Thus, a receive beam may change for the same transmission beam, for example, due to a change in the position and/or orientation of the transmitting UE. Aspects presented herein enable a transmitting UE to determine a variable duration for transmitting SLSS in order to reduce the beam shape sensitivity due to the orientation of the transmitting UE.

Figure 5:
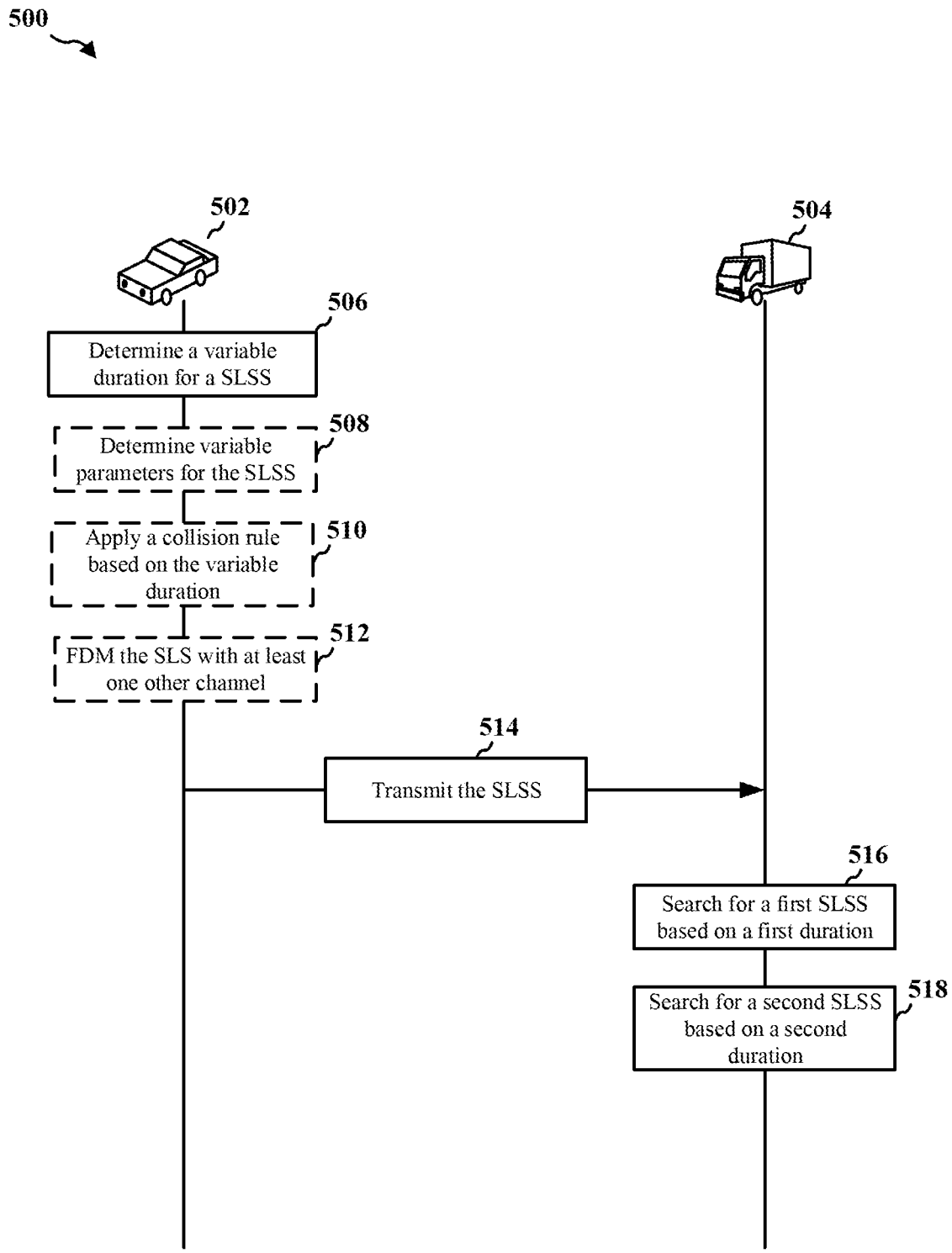
FIG. 5 illustrates an example communication flow between a first device and a second device, in accordance with certain aspects of the disclosure.

FIG. 5 illustrates an example communication flow 500 between a device 502 (e.g., UE) and a device 504 (e.g., UE). The communication may be based on V2X, V2V, or D2D based communication directly from a transmitting device to a receiving device. The communication transmitting from device 502, 504 may be broadcast and received by multiple receiving devices within range of a particular transmitting device, as described in connection with FIG. 4.

At 506, the transmitting device 502 may be configured to determine a variable duration for a SLSS. The device 502 may use a first duration for the SLSS on a first channel, and use a second duration for the SLSS on a second channel. The first duration or the second duration may comprise the variable duration. In some aspects, the first duration of the first channel may be different than the second duration of the second channel. For example, the first duration of the first channel may be longer than the second duration of the second channel. The first duration being longer than the second duration may allow the first channel to be transmitted using a broader beam, which may assist in reducing the sensitivity of the transmission beam based on the orientation of the transmitting device 502. For example, an omni-beam may have a lowest sensitivity to the orientation of the transmitting device 502. Use of a broader beam by the transmitter may assist the receiving UE in performing between reception beam training, even if the transmitting UE changes orientation. Within a single SS burst/period, a single long-duration broad beam may provide a similar effect to sweeping multiple short duration narrow beams. Looking across bursts, a broader beam may have advantages over the sweeping of narrow beams. The disclosure is not intended to be limited to the first duration or the second duration. In some aspects, the transmitting device 502 may be configured to utilize a plurality of durations, such that the plurality of durations may comprise the variable duration. In addition, the first duration being longer may allow the transmitting device to improve its distance coverage.

The robustness provided by a wider beam may be acceptable or preferable for initial acquisition, e.g., in which mobility status may not be known. However, after initial acquisition, it may be helpful to train refined beams. For example, it may be helpful to obtain the beamforming gain and/or to avoid a time-domain overhead. Thus, a second S-SSB may be transmitted having different parameters. One of the parameters may be a different duration than the first S-SSB. Therefore, a mix of S-SSBs may be transmitted. The second duration being shorter than the first duration may allow the second channel to be transmitted using a narrower beam, which may allow the transmission of the SLSS to be further refined. For example, refinement may occur during random access channel (RACH) procedures, or after the transmitting device 502 is RRC connected, or by CSI-RS configuration. In some aspects, a first SLSS for the first channel may be based on a synchronization raster, and a second SLSS for the second channel may be at an offset to the synchronization raster. In some aspects, the first or second SLSS may be based on a different offset not defined by the synchronization raster. In some aspects, the first and/or second SLSS may be based on the synchronization raster, or certain durations may be off-raster, at specific offsets.

In some aspects, a cross-S-SSB QCL relationship may be indicated for the first S-SSB and the second S-SSB. As an example, an S-SSB repetition may be indicated. The indicated relationship between the S-SSBs may be used to increase coverage for some S-SSBs (e.g., for use as a positioning reference signal (PRS)). The indication may apply after initial acquisition, for example.

Each S-SSB channel that the UE transmits may have multiple S-SSB beams, and the S-SSB channel on the different S-SSB beams may have a same duration. Different S-SSB channels may have different durations. Repetitions of symbols of the S-SSB and/or a lower SCS may be used to increase a duration of the S-SSB. Repetition levels may be different for different signals of the S-SSB. For example, repetition levels may be different for the S-PSS, the S-SSS, and/or the PSBCH within a single S-SSB. The repetition levels of the different signals of the S-SSB may be the same across multiple S-SSB occasions in an S-SSB channel. In some examples, the repetition levels of the different signals of the S-SSB may be the same across each of the S-SSB occasions in an S-SSB channel.

At 508, the transmitting device 502 may be configured to determine variable parameters for the SLSS. For example, in some aspects, the transmitting device 502 may determine a variable subcarrier spacing (SCS) for the SLSS. In some aspects, the SLSS may be transmitted based on the determined variable SCS. In some aspects, the transmitting device 502 may utilize a first SCS to transmit the first SLSS and may utilize a second SCS to transmit the second SLSS. The first SCS may be less than the second SCS. The transmitting device 502 may use the first duration of the first SLSS that is longer than the second duration. The first SCS being less than the second SCS allows the first channel to achieve a longer duration.

In some aspects, the transmitting device 502 may be configured to determine a variable beam width for the SLSS. The SLSS may be transmitted using the determined beam width. A longer duration SLSS may be transmitted by the UE using a wider beam than a shorter duration SLSS. In some aspects, the SLSS that has the longer duration may be transmitted using an omnidirectional beam. The wider beam width may allow for improvements in distance coverage. The wider beam width may also reduce the transmission beam sensitivity of the orientation of the transmitting device 502. For example, a receiving device 504, if stationary, may be able to train its reception beam better even if the transmitting device 502 changes its orientation. In addition, the receiving device 504 may be able to average across multiple SLSS periods even if the transmitting device 502 changes its orientation.

In some aspects, the transmitting device 502 may be configured to determine additional variable parameters for the SLSS. In some aspects, the variable parameter may be at least one of a periodicity, a frequency location, a frequency hopping pattern, or a time domain location of PBCH payload locations within a frame or within an S-SSB. Different S-SSB channels may have different periodicities, frequency locations, frequency hopping patterns, PBCH payloads, time domain locations with a frame or S-SSB period, etc. In some aspects, the first and/or second channels may include at least one of the additional variable parameters. In some aspects, an SLSS having a short duration may not include a PBCH payload, while an SLSS having a longer duration may include a PBCH payload indicating the presence or configuration of the shorter SLSS. This may allow for different combinations of time division multiplexing (TDM) or frequency division multiplexing (FDM) of the S-SSB with different durations. Additionally, such aspects may enable a trade between beam robustness and a time domain overhead. In some other aspects, PSBCH payload of shorter S-SSBs may indicate presence or configuration of longer S-SSBs. Also, in some aspects, an S-SSB channel with one periodicity may indicate presence or configure parameters for another S-SSB channel with another periodicity.

At 510, the transmitting device 502 may be configured to apply a collision rule. In some aspects, the transmitting device 502 may apply the collision rule based on the variable duration determined by the transmitting device 502 for the SLSS. For example, the collision rules may prioritize S-SSB over other channels, and may only apply to certain durations of the S-SSB.

At 512, the transmitting device 502 may be configured to FDM the SLSS with at least one other channel. In some aspects, the transmitting device 502 may FDM the SLSS with at least one other channel based on the variable duration determined by the transmitting device 502 for the SLSS.

At 514, the transmitting device 502 may be configured to transmit the SLSS using the variable duration determined by the transmitting device 502. In some aspects, the transmitting device 502 may use multiple beams to transmit the SLSS. The SLSS, in some aspects, may be transmitted using a same duration on each of the multiple beams for a corresponding channel. In some aspects, the transmitting device 502 may transmit repetitions when transmitting the SLSS using a first duration that is longer than a second duration. The SLSS may comprise an S-PSS), a S-SSS, and a PSBCH. The transmitting device 502 may use a different repetition level for at least one of the S-PSS, the S-SSS, or the PSBCH.

At 516, the receiving device 504 may be configured to search for a first SLSS. In some aspects, the receiving device 504 may search for the first SLSS based on a first duration for an initial acquisition. The first SLSS may comprise an S-PSS, an S-SSS, and a PSBCH. The first SLSS may be based on a different repetition level for at least one of the S-PSS, the S-SSS, or the PSBCH. The receiving device 504 may be configured to average across multiple S-SSB periods when searching for the first SLSS. In some aspects, the first duration of the first SLSS may be long such that the receiving device 504 may train it reception beam, even if the transmitting device 502 changes its orientation.

At 518, the receiving device 504 may be configured to search for a second SLSS. In some aspects, the receiving device 504 may search for the second SLSS based on a second duration for a refinement. For example, after the receiving device 504 has acquired the first SLSS, the receiving device 504 may train the beams based on the second SLSS having the shorter duration, in order to obtain the beamforming gain and avoid any time domain overhead. The different durations between the first and second SLSS allows for obtaining the beamforming gain while reducing the time domain overhead. In some aspects, beam refinement may occur during RACH procedure, after the receiving device 504 is in the RRC connected state, or by CSI-RS configurations. In some aspects, the first duration may be longer than the second duration. In some aspects, the first SLSS may comprise more symbol repetitions than the second SLSS. The first SLSS may have a lower SCS that the second SLSS.

In some aspects, the first SLSS and the second SLSS may be based on at least one different parameter. For example, the at least one different parameter may comprise a periodicity, a frequency location, a frequency hopping pattern, or a time domain location of a PBCH payload locations with a frame or within a S-SSB. In some aspects, one of the first SLSS and the second SLSS may be based on a synchronization raster, where the other of the first SLSS and the second SLSS may be at an offset to the synchronization raster.

In some aspects, the first SLSS and the second SLSS may be associated with different RACH resources. In some aspects, the RACH resources associated with the first SLSS and the second SLSS may have different configurations. In some aspects, the PRACHs associated with the first SLSS and the second SLSS may have different formats. As an example, a longer SLSS may be associated with a longer RACH symbol or a longer PRACH format.

Figure 6:
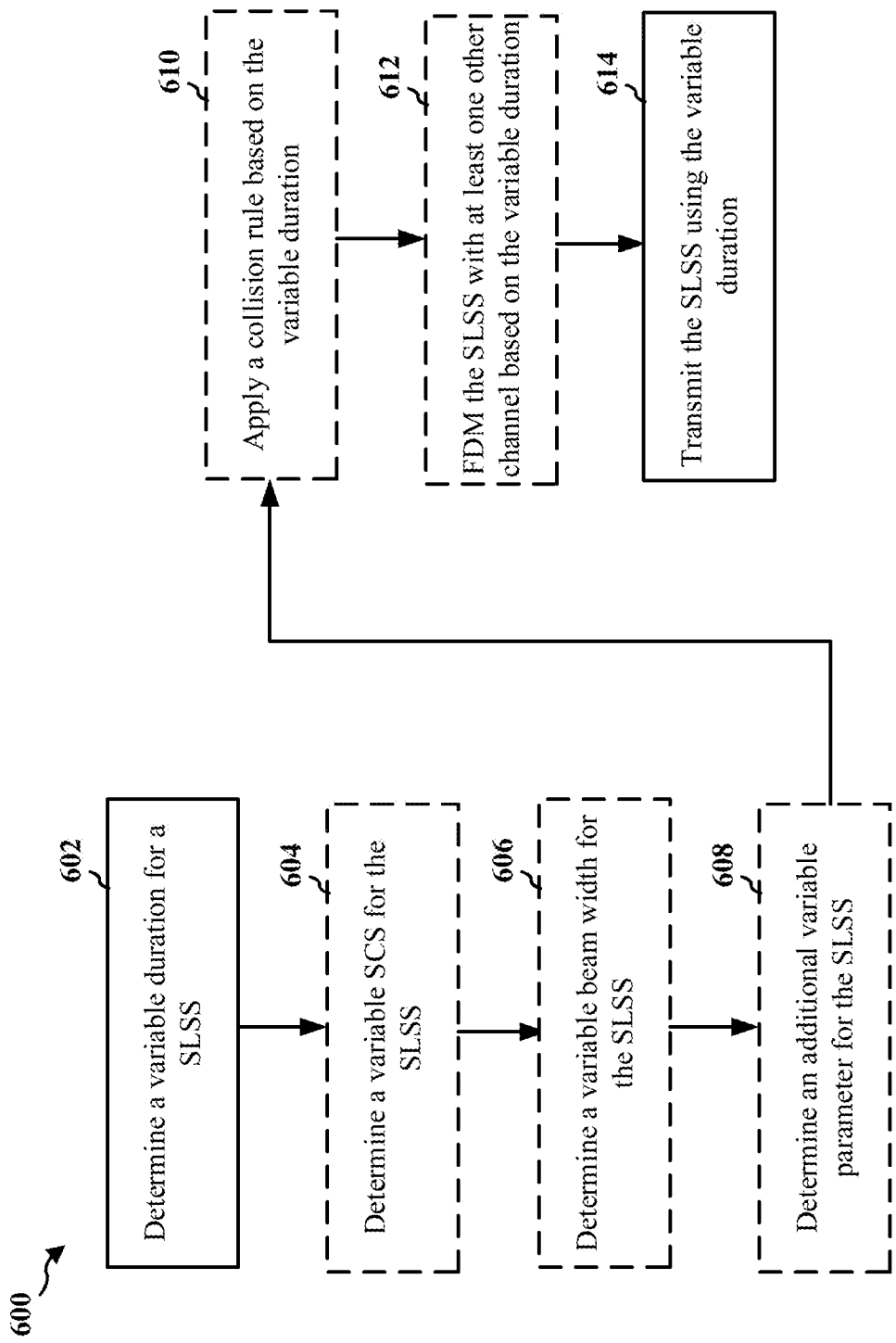
FIG. 6 is a flowchart of a method of wireless communication.

FIG. 6 is a flowchart 600 of a method of wireless communication. The method may be performed by a UE or a component of a UE (e.g., the UE 104, 350, 402, 404, 406, 408, 502, 504, 750, 1050; the apparatus 702/702'; the processing system 814, which may include the memory 360 and which may be the entire UE 350 or a component of the UE 350, such as the TX processor 368, the RX processor 356, and/or the controller/processor 359). According to various aspects, one or more of the illustrated operations of the method 600 may be omitted, transposed, and/or contemporaneously performed. The UE may implement the method of diagram 500. Optional aspects are illustrated with a dashed line. The method may improve synchronization among UEs for sidelink communication.

At 602, the UE may determine a variable duration for a SLSS. For example, 602 may be performed by duration component 706 of apparatus 702. In some aspects, the UE may use a first duration for the SLSS on a first channel, and use a second duration for the SLSS on a second channel. The first duration or the second duration may comprise the variable duration. In some aspects, the first duration of the first channel may be different than the second duration of the second channel. In some aspects, a first SLSS for the first channel may be based on a synchronization raster, and a second SLSS for the second channel may be at an offset to the synchronization raster.

At 604, the UE may determine a variable SCS for the SLSS. For example, 604 may be performed by SCS component 708 of apparatus 702. In some aspects, the SLSS may be transmitted based on the determined variable SCS. In some aspects, the UE may utilize a first SCS to transmit the first SLSS and may utilize a second SCS to transmit the second SLSS. The first SCS may be less than the second SCS. The UE may use the first duration of the first SLSS that is longer than the second duration.

At 606, the UE may determine a variable beam width for the SLSS. For example, 606 may be performed by beam width component 710 of apparatus 702. In some aspects, the SLSS may be transmitted using the determined beam width. A longer duration SLSS may be transmitted by the UE using a wider beam than a shorter duration SLSS. In some aspects, the SLSS that has the longer duration may be transmitted using an omnidirectional beam.

At 608, the UE may determine an additional variable parameter for the SLSS. For example, 608 may be performed by parameter component 712 of apparatus 702. In some aspects, the additional variable parameters may include at least one of a periodicity, a frequency location, a frequency hopping pattern, or a time domain location of a PBCH payload locations within a frame or within an S-SSB. In some aspects, the first and/or second channels may include at least one of the additional variable parameters.

At 610, the UE may apply a collision rule. For example, 610 may be performed by collision rule component 714 of apparatus 702. In some aspects, the UE may apply the collision rule based on the variable duration determined by the UE for the SLSS.

At 612, the UE may frequency division multiplex (FDM) the SLSS with at least one other channel. For example, 612 may be performed by FDM component 716 of apparatus 702. In some aspects, the UE may FDM the SLSS with at least one other channel based on the variable duration determined by the UE for the SLSS.

At 614, the UE may transmit the SLSS using the variable duration determined by the UE. For example, 614 may be performed by SLSS component 718 of apparatus 702. In some aspects, the UE may use multiple beams to transmit the SLSS. The SLSS, in some aspects, may be transmitted using a same duration on each of the multiple beams for a corresponding channel. In some aspects, the UE may transmit repetitions when transmitting the SLSS using a first duration that is longer than a second duration. The SLSS may comprise a S-PSS, an S-SSS, and a PSBCH. The UE may use a different repetition level for at least one of the S-PSS, the S-SSS, or the PSBCH.

Figure 7:
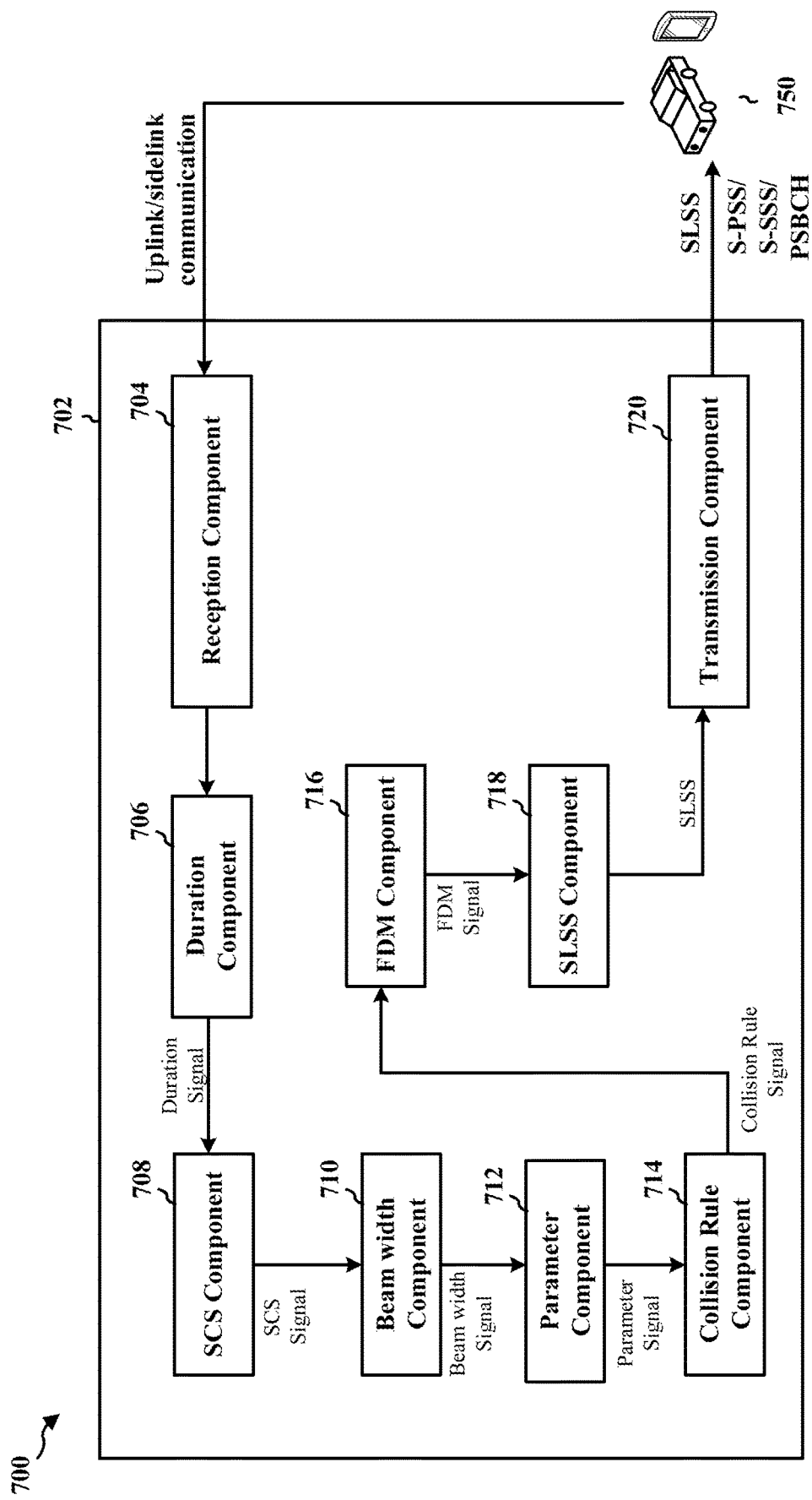
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE or a component of a UE. The apparatus may perform the method of flowchart 600. The apparatus includes a reception component 704 that may be configured to receive various types of signals/messages and/or other information from other devices, including, for example, the UE 750. The apparatus includes a duration component 706 that may be configured to determine a variable duration for a SLSS, e.g., as described in connection with 602 of FIG. 6. The apparatus includes a SCS component 708 that may be configured to determine a variable SCS for the SLSS, e.g., as described in connection with 604 of FIG. 6. The apparatus includes a beam width component 710 that may be configured to determine a variable beam width for the SLSS, e.g., as described in connection with 606 of FIG. 6. The apparatus includes a parameter component 712 that may be configured to determine an additional variable parameter for the SLSS, e.g., as described in connection with 608 of FIG. 6. The apparatus includes a collision rule component 714 that may be configured to apply a collision rule, e.g., as described in connection with 610 of FIG. 6. The apparatus includes a FDM component 716 that may be configured to FDM the SLSS with at least one other channel, e.g., as described in connection with 612 of FIG. 6. The apparatus includes a SLSS component 718 that may be configured to transmit the SLSS using the variable duration determined by the UE, e.g., as described in connection with 614 of FIG. 6. The apparatus includes a transmission component 720 that may be configured to transmit various types of signals/messages and/or other information to other devices, including, for example, the UE 750.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
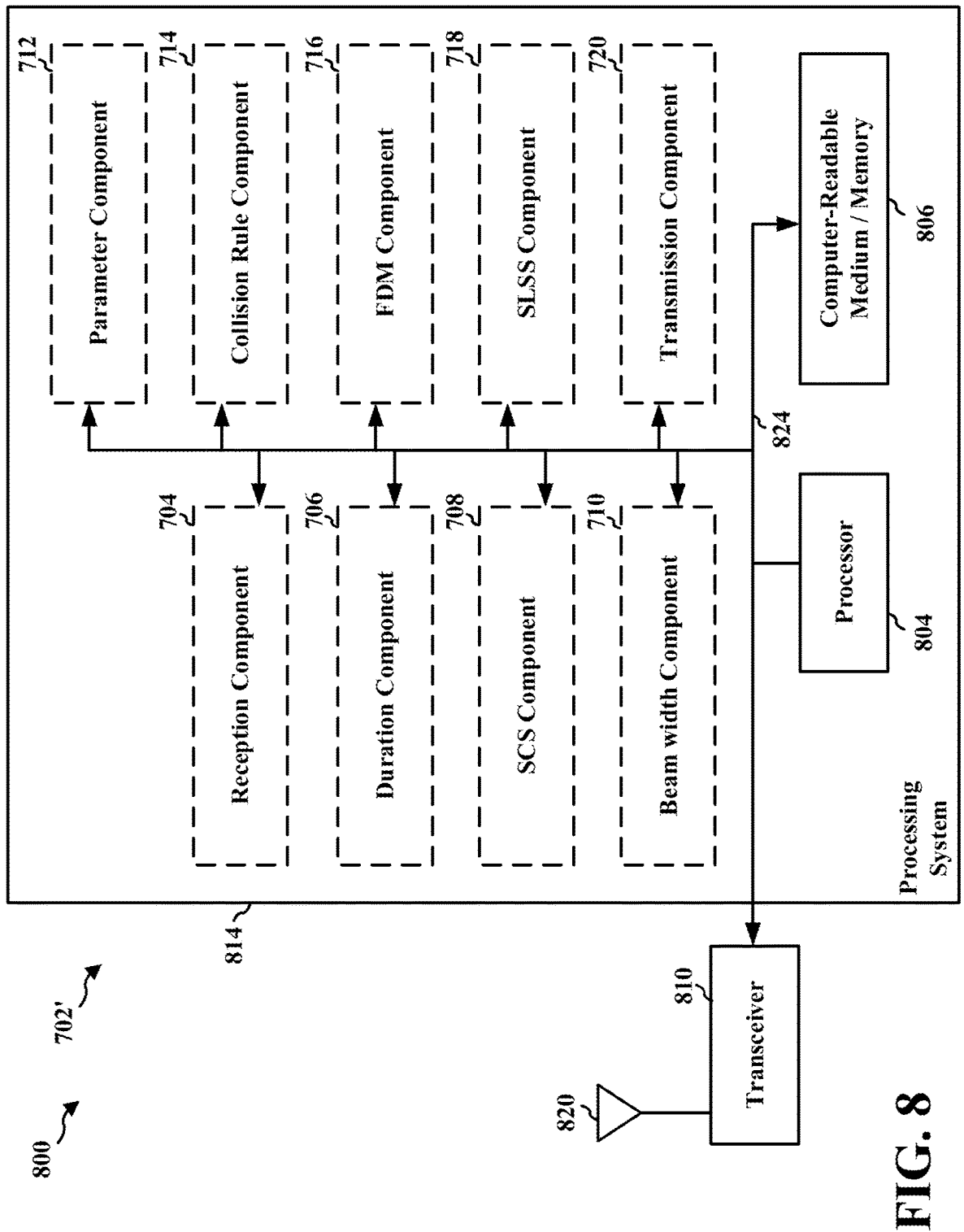
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 720, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the device 310 or the device 350 and may include the memory 376, 360 and/or at least one of the TX processor 316, 368, the RX processor 370, 356, and the controller/processor 375, 359. Alternatively, the processing system 814 may be the entire UE (e.g., see device 310 or 350 of FIG. 3).

In one configuration, the apparatus 702/702' for wireless communication includes means for determining a variable duration for a SLSS. The apparatus includes means for transmitting the SLSS using the variable duration determined by the wireless device. The apparatus further includes means for determining a variable SCS for the SLSS. The SLSS further transmitted using the determined variable SCS. The apparatus further includes means for determining a variable beam width for the SLSS. The SLSS may be transmitted using the determined beam width. The apparatus further includes means for determining an additional variable parameter for the SLSS. The additional variable parameters may comprise at least one of a periodicity, a frequency location, a frequency hopping pattern, or a time domain location of a PBCH payload locations within a frame or within an S-SSB. The apparatus further includes means for applying a collision rule based on the variable duration determined by the wireless device for the SLSS. The apparatus further includes means for FDM the SLSS with at least one other channel based on the variable duration determined by the wireless device for the SLSS. The aforementioned means may be one or more of the aforementioned components of the apparatus 702 and/or the processing system 814 of the apparatus 702' configured to perform the functions recited by the aforementioned means. As described supra, the processing system 814 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Figure 9:
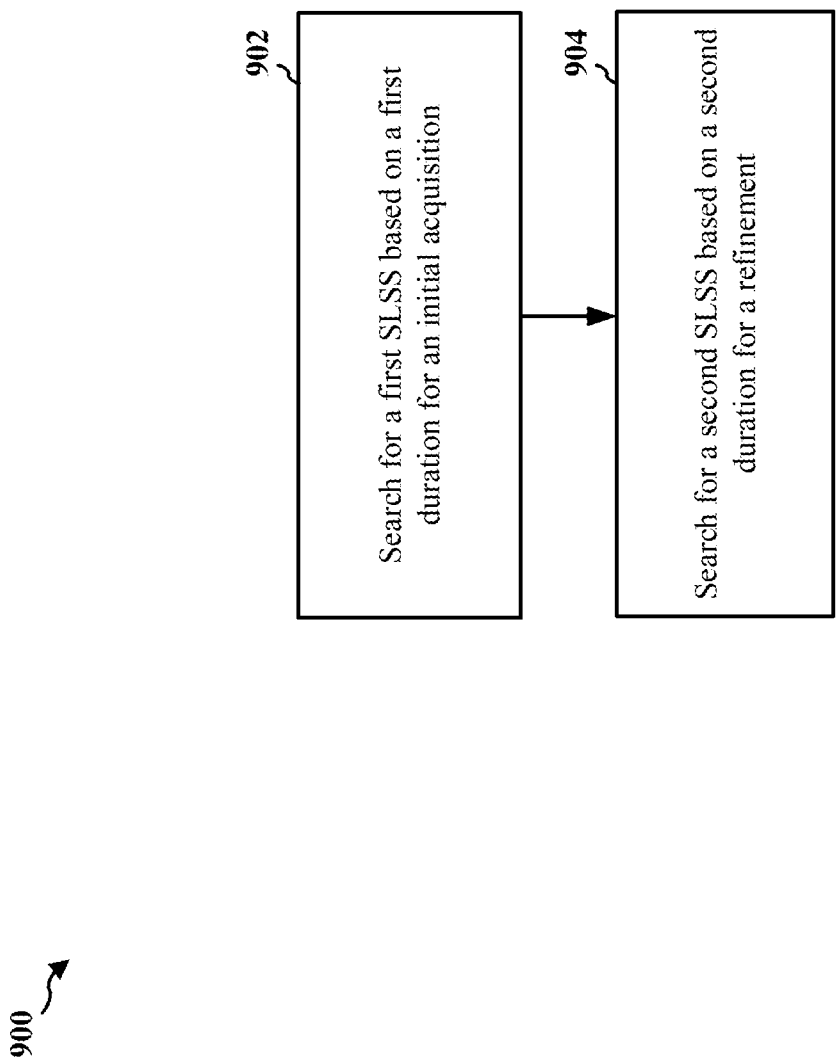
FIG. 9 is a flowchart of a method of wireless communication.

FIG. 9 is a flowchart 900 of a method of wireless communication. The method may be performed by a UE or a component of a UE (e.g., the UE 104, 350, 402, 404, 406, 408, 502, 504, 750, 1050; the apparatus 1002/1002'; the processing system 1114, which may include the memory 360 and which may be the entire UE 350 or a component of the UE 350, such as the TX processor 368, the RX processor 356, and/or the controller/processor 359). According to various aspects, one or more of the illustrated operations of the method 900 may be omitted, transposed, and/or contemporaneously performed. The UE may implement the method of diagram 500. Optional aspects are illustrated with a dashed line. The method may improve synchronization among UEs for sidelink communication.

At 902, the UE may search for a first SLSS. For example, 902 may be performed by $1^{st}$ SLSS component 1006 of apparatus 1002. In some aspects, the UE may search for the first SLSS based on a first duration for an initial acquisition. The first SLSS may comprise an S-PSS, an S-SSS, and a PSBCH. The first SLSS may be based on a different repetition level for at least one of the S-PSS, the S-SSS, or the PSBCH.

At 904, the UE may search for a second SLSS. For example, 904 may be performed by $2^{nd}$ SLSS component 1008 of apparatus 1002. In some aspects, the UE may search for the second SLSS based on a second duration for a refinement. In some aspects, the first duration may be longer than the second duration. In some aspects, the first SLSS may comprise more symbol repetitions than the second SLSS. The first SLSS may have a lower SCS that the second SLSS. In some aspects, the first SLSS and the second SLSS may be based on at least one different parameter. For example, the at least one different parameter may comprise a periodicity, a frequency location, a frequency hopping pattern, or a time domain location of a PSBCH payload locations with a frame or within a S-SSB. In some aspects, one of the first SLSS and the second SLSS may be based on a synchronization raster, where the other of the first SLSS and the second SLSS may be at an offset to the synchronization raster.

Figure 10:
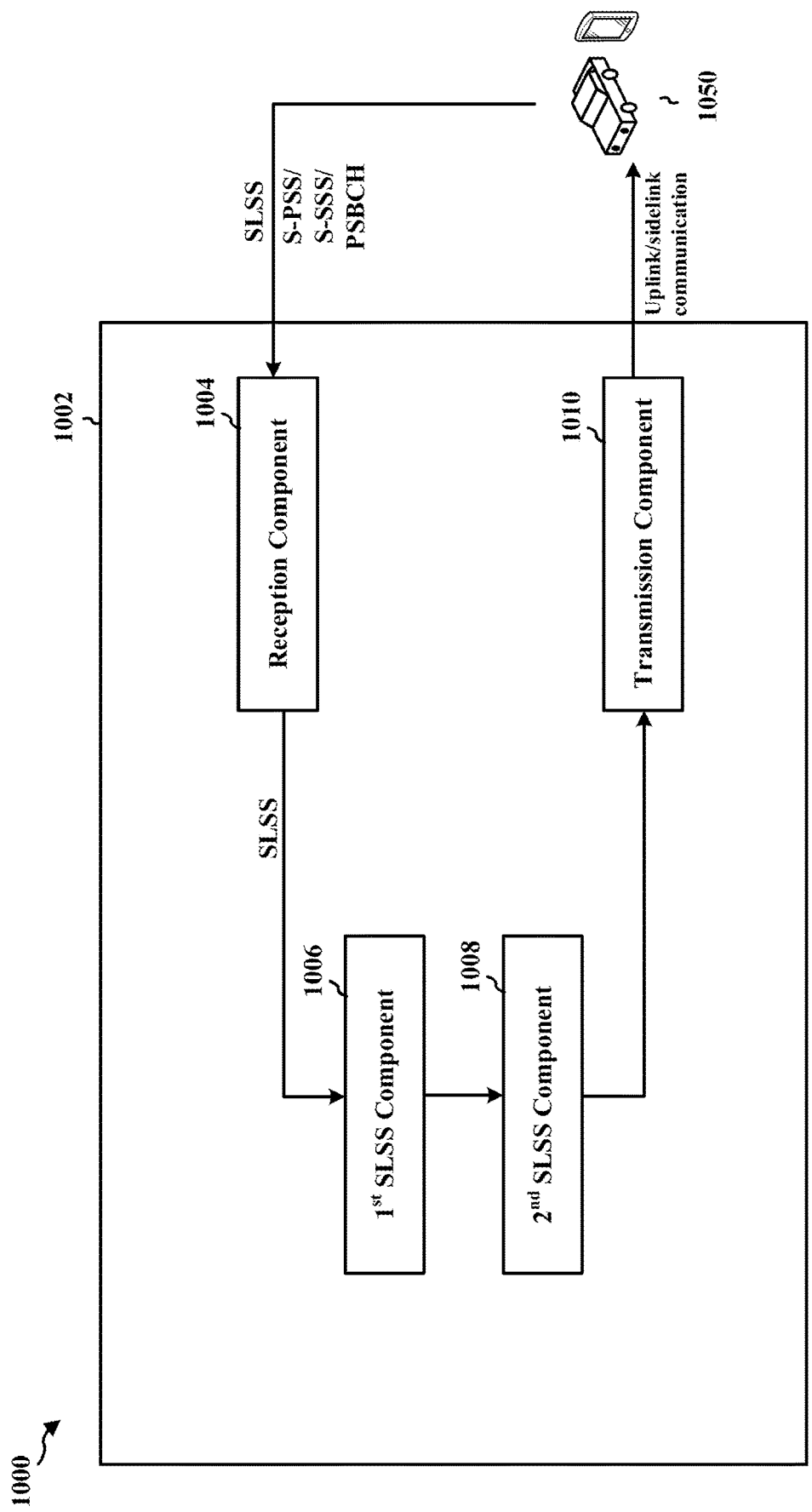
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus may perform the method of flowchart 900. The apparatus includes a reception component 1004 that may be configured to receive various types of signals/messages and/or other information from other devices, including, for example, the UE 1050. The apparatus includes a 1$^{st}$ SLSS component 1006 that may be configured to search for a first SLSS, e.g., as described in connection with 902 of FIG. 9. The apparatus includes a 2$^{nd}$ SLSS component 1008 that may be configured to search for a second SLSS, e.g., as described in connection with 904 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
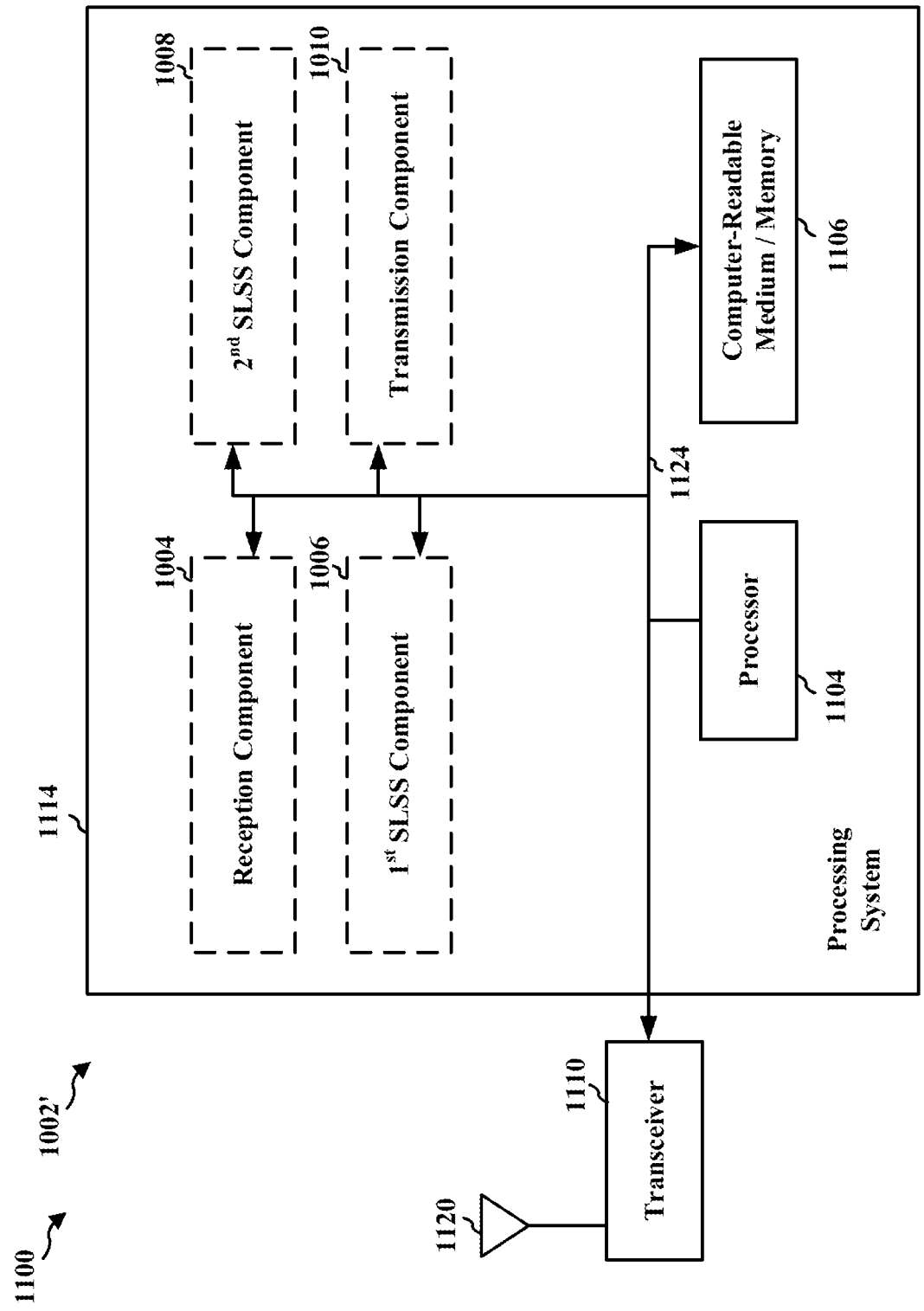
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the device 310 or the device 350 and may include the memory 376, 360 and/or at least one of the TX processor 316, 368, the RX processor 370, 356, and the controller/processor 375, 359. Alternatively, the processing system 1114 may be the entire UE (e.g., see device 310 or 350 of FIG. 3).

In one configuration, the apparatus 1002/1002' for wireless communication includes means for searching for a first SLSS based on a first duration for an initial acquisition. The apparatus includes means for searching for a second SLSS based on a second duration for a refinement, wherein the first duration is longer than the second duration. The aforementioned means may be one or more of the aforementioned components of the apparatus 1002 and/or the processing system 1114 of the apparatus 1002' configured to perform the functions recited by the aforementioned means. As described supra, the processing system 1114 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

The present disclosure relates to utilizing variable durations for transmitting the SLSS. Aspects presented herein provide a solution to the problem of the receive beam and transmission beam changing due to the changing in the position and/or orientation of the transmitting UE by utilizing variable durations for transmitting the SLSS. UEs may be configured to act as a source of SLSS. The UE may be instructed by the network to transmit the SLSS, the UE may decide on its own to transmit the SLSS while being covered by a cell, or the UE may send the SLSS when it is out of cell coverage. A UE may be configured to utilize beamforming to transmit the SLSS, which may allow the transmitting UE to account for distance coverage, but at the expense of angular coverage. At least one advantage of the disclosure is that using variable repetition over different time durations may make up for distance coverage loss from broader beams.

In relation to the technology disclosed herein, in wireless communication systems such as system 100, broader transmitted beams make the transmit beam shape less sensitive to transmitter, such as UE 104, orientation—in the case of an omnidirectional beam, mostly insensitive to transmitter orientation. If the receiving device, such as another UE 104, is stationary, then the receiving device can train its reception more readily on a broader beam from the transmitter, The robustness derived from broader transmitter beam widths comes with a tradeoff—longer transmit duration. This tradeoff can be acceptable in initial acquisition, where mobility status is unknown. However, after acquiring, it is advantageous to train one or more refined beams—taking advantage of beamforming gain and avoiding time domain overhead associated with broader beams and longer transmit duration. This suggests, in some circumstances, a mix of SSBs—some broad and some narrow.

A cross SSB QCL relation can be indicated, effectively indicating SSB-repetition as a way to create "longer," but possibly non-contiguous in time, SSB. In such approaches, the indication is not restricted to the typical DL SSB structure. In some examples of the technology disclosed herein, separate SSB channels can be used. Each SSB channel can have multiple SSB beams, all of the same duration.

In some examples, different SSB channels can have different durations. In some such examples, the technology can repeat OFDM signals containing SSB, or use lower SCS to achieve longer durations. Repetition levels can be different for PSS, SSS, and PBCH within an SSB (but the same across all SSB occasions in an SSB channel). Further, different SSB channels can have different periodicities, frequency locations, frequency hopping patterns, PBCH payloads, and time domain locations with a frame or SSB period. For example, very short SSBs may not have PBCH at all. The PBCH payload of long SSBs can indicate the presence/configuration of shorter SSBs. Such approaches allow for different combinations of TDM and FDM of the SSBs of different duration, and allow for tradeoffs between beam robustness and time-domain overhead. In some examples, all channels can be on sync-raster, or certain durations can be off-raster at specific offsets (effectively defining a new raster for those SSBs).

For initial acquisition, the receiver can search for longer-duration SSBs. Subsequently, the receiver can refine using the shorter-duration SSBs. RACH resources can be associated with SSBs of multiple channels, with longer duration SSBs associated with longer duration RACH. It should be noted that in this context, RACH resources may reuse procedures for transmission and associated receptions of follow-up messages similar to access link RACH procedure, but the resource structure, waveform and channelization may be either similar to those of access link ("Uu") RACH resources, or may have alternative designs. Collision rules and FDM handling for SSB and other channels can be different for different SSB channels and durations. For example, rules prioritizing SSBs over other channels can apply only to certain SSB durations.

In some examples, while the duration in terms of number of OFDM-symbols in one SSB can be fixed (e.g., 2+2+9 for PSS/SSS/PBCH respectively, with normal cyclic prefix, and 2+2+7 in case of extended cyclic prefix), the number of such SSBs can be different. For example, based on an IE, it can be 1, 2, 4, 8, 16, 32, or 64 in FR2 120 KHz numerology. Other numerologies/FRs can offer a subset of these possibilities, e.g.: FR1, SCS=15 kHz: 1, 2; FR1, SCS=30 kHz: 1, 2, 4; FR1, SCS=60 kHz: 1, 2, 4, 8; FR2, SCS=60 kHz: 1, 2, 4, 8, 16, 32; FR2, SCS=120 kHz: 1, 2, 4, 8, 16, 32, 64. Even within a single numerology there could be multiple SLSS configurations with different number of SSBs. Multiple numerologies offer another dimension that results in variable duration SLSS (because the number of symbols may be fixed but symbol duration itself depends on numerology). Further examples include different SSB durations corresponding to different beam-shapes, and the idea of cross-SSB QCL for sidelink It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
   determining a variable duration and a variable beam width for a sidelink synchronization signal (SLSS); and
   transmitting the SLSS using the variable duration and the variable beam width determined by the wireless device.

2. The method of claim 1, wherein the wireless device uses a first duration for the SLSS on a first channel, and uses a second duration for the SLSS on a second channel, wherein the first duration or the second duration comprise the variable duration.

3. The method of claim 2, wherein the first duration of the first channel is different than the second duration of the second channel.

4. The method of claim 2, wherein the wireless device uses multiple beams to transmit the SLSS, and wherein the SLSS is transmitted using a same duration on each of the multiple beams for a corresponding channel.

5. The method of claim 1, wherein the wireless device transmits repetitions when transmitting the SLSS using a first duration that is longer than a second duration.

6. The method of claim 5, wherein the SLSS comprises a sidelink primary synchronization signal (S-PSS), a sidelink secondary synchronization signal (S-SSS) and a physical sidelink broadcast channel (PSBCH), and wherein the wireless device uses a different repetition for at least one of the S-PSS, the S-SSS, or the PSBCH.

7. The method of claim 1, further comprising:
   determining a variable subcarrier spacing (SCS) for the SLSS, wherein the SLSS is further transmitted using the determined variable SCS.

8. The method of claim 7, wherein the wireless device utilizes a first subcarrier spacing (SCS) to transmit a first SLSS, and a second SCS to transmit a second SLSS, wherein the first SCS is less than the second SCS, and wherein the wireless device uses a first duration of the first SLSS that is longer than a second duration.

9. The method of claim 1, wherein a longer duration SLSS is transmitted using a wider beam than a shorter duration SLSS.

10. The method of claim 9, wherein the longer duration SLSS is transmitted using an omnidirectional beam.

11. The method of claim 1, further comprising determining an additional variable parameter for the SLSS, wherein the additional variable parameter comprises at least one of:
   a periodicity,
   a frequency location,
   a frequency hopping pattern, and
   a time domain location of a physical broadcast channels (PBCH) payload locations within a frame or within a sidelink synchronization signal block (S-SSB).

12. The method of claim 1, wherein a first SLSS for a first channel is based on a synchronization raster, and wherein a second SLSS for a second channel is at an offset to the synchronization raster.

13. The method of claim 1, further comprising:
   applying a collision rule based on the variable duration determined by the wireless device for the SLSS.

14. The method of claim 1, further comprising:
   frequency division multiplexing (FDM) the SLSS with at least one other channel based on the variable duration determined by the wireless device for the SLSS.

15. An apparatus for wireless communication at a wireless device, comprising:
   means for determining a variable duration and a variable beam width for a sidelink synchronization signal (SLSS); and
   means for transmitting the SLSS using the variable duration and the variable beam width determined by the wireless device.

16. The apparatus of claim 15, wherein the wireless device uses a first duration for the SLSS on a first channel, and uses a second duration for the SLSS on a second channel, wherein the first duration or the second duration comprise the variable duration.

17. The apparatus of claim 16, wherein the first duration of the first channel is different than the second duration of the second channel.

18. The apparatus of claim 16, wherein the wireless device uses multiple beams to transmit the SLSS, and wherein the SLSS is transmitted using a same duration on each of the multiple beams for a corresponding channel.

19. The apparatus of claim 15, wherein the wireless device transmits repetitions when transmitting the SLSS using a first duration that is longer than a second duration.

20. The apparatus of claim 19, wherein the SLSS comprises a sidelink primary synchronization signal (S-PSS), a sidelink secondary synchronization signal (S-SSS) and a physical sidelink broadcast channel (PSBCH), and wherein the wireless device uses a different repetition for at least one of the S-PSS, the S-SSS, or the PSBCH.

21. The apparatus of claim 15, further comprising:
   means for determining a variable subcarrier spacing (SCS) for the SLSS, wherein the SLSS is further transmitted using the determined variable SCS.

22. The apparatus of claim 21, wherein the wireless device utilizes a first subcarrier spacing (SCS) to transmit a first SLSS, and a second SCS to transmit a second SLSS, wherein the first SCS is less than the second SCS, and wherein the wireless device uses a first duration of the first SLSS that is longer than a second duration.

23. The apparatus of claim 15, wherein a longer duration SLSS is transmitted using a wider beam than a shorter duration SLSS.

24. The apparatus of claim 23, wherein the longer duration SLSS is transmitted using an omnidirectional beam.

25. The apparatus of claim 15, further comprising determining an additional variable parameter for the SLSS, wherein the additional variable parameter comprises at least one of:
   a periodicity,
   a frequency location,
   a frequency hopping pattern, and
   a time domain location of a physical broadcast channels (PBCH) payload locations within a frame or within a sidelink synchronization signal block (S-SSB).

26. An apparatus for wireless communication at a wireless device, comprising:
   a memory; and
   at least one processor coupled to the memory and configured to:
      determine a variable duration and a variable beam width for a sidelink synchronization signal (SLSS); and
      transmit the SLSS using the variable duration and the variable beam width determined by the wireless device.

27. The apparatus of claim 26, wherein the wireless device uses a first duration for the SLSS on a first channel, and uses a second duration for the SLSS on a second channel, wherein the first duration or the second duration comprise the variable duration.

28. The apparatus of claim 27, wherein the first duration of the first channel is different than the second duration of the second channel.

29. The apparatus of claim 27, wherein the wireless device uses multiple beams to transmit the SLSS, and wherein the SLSS is transmitted using a same duration on each of the multiple beams for a corresponding channel.

30. The apparatus of claim 26, wherein the wireless device transmits repetitions when transmitting the SLSS using a first duration that is longer than a second duration.

31. The apparatus of claim 30, wherein the SLSS comprises a sidelink primary synchronization signal (S-PSS), a sidelink secondary synchronization signal (S-SSS) and a physical sidelink broadcast channel (PSBCH), and wherein the wireless device uses a different repetition for at least one of the S-PSS, the S-SSS, or the PSBCH.

32. The apparatus of claim 26, wherein the at least one processor further configured to:
   determine a variable subcarrier spacing (SCS) for the SLSS, wherein the SLSS is further transmitted using the determined variable SCS.

33. The apparatus of claim 32, wherein the wireless device utilizes a first subcarrier spacing (SCS) to transmit a first SLSS, and a second SCS to transmit a second SLSS, wherein the first SCS is less than the second SCS, and wherein the wireless device uses a first duration of the first SLSS that is longer than a second duration.

34. The apparatus of claim 26, wherein a longer duration SLSS is transmitted using a wider beam than a shorter duration SLSS.

35. The apparatus of claim 34, wherein the longer duration SLSS is transmitted using an omnidirectional beam.

36. The apparatus of claim 26, further comprising determining an additional variable parameter for the SLSS, wherein the additional variable parameter comprises at least one of:
   a periodicity,
   a frequency location,
   a frequency hopping pattern, and a time domain location of a physical broadcast channels (PBCH) payload locations within a frame or within a sidelink synchronization signal block (S-SSB).

37. A non-transitory computer-readable medium storing computer executable code for wireless communication at a wireless device, the code when executed by a processor cause the processor to:
determine a variable duration and a variable beam width for a sidelink synchronization signal (SLSS); and
transmit the SLSS using the variable duration and a variable beam width determined by the wireless device.

38. A method of wireless communication at a user equipment (UE), comprising:
searching for a first SLSS based on a first duration for an initial acquisition; and
searching for a second SLSS based on a second duration for a refinement, wherein the first duration is longer than the second duration.

39. The method of claim 38, wherein the first SLSS comprises more symbol repetitions than the second SLSS.

40. The method of claim 38, wherein the first SLSS comprises a sidelink primary synchronization signal (S-PSS), a sidelink secondary synchronization signal (S-SSS) and a physical sidelink broadcast channel (PSBCH), and wherein the first SLSS is based on a different repetition for at least one of the S-PSS, the S-SSS, or the PSBCH.

41. The method of claim 38, wherein the first SLSS has a lower subcarrier spacing (SCS) than the second SLSS.

42. The method of claim 38, wherein the first SLSS and the second SLSS are based on at least one different parameter, wherein the at least one different parameter comprises:
a periodicity,
a frequency location,
a frequency hopping pattern, and
a time domain location of a physical broadcast channels (PBCH) payload locations within a frame or within a sidelink synchronization signal block (S-SSB).

43. The method of claim 38, wherein one of the first SLSS and the second SLSS is based on a synchronization raster, and wherein an other of the first SLSS and the second SLSS is at an offset to the synchronization raster.

44. An apparatus for wireless communication, comprising:
means for searching for a first SLSS based on a first duration for an initial acquisition; and
means for searching for a second SLSS based on a second duration for a refinement, wherein the first duration is longer than the second duration.

45. The apparatus of claim 44, wherein the first SLSS comprises more symbol repetitions than the second SLSS.

46. The apparatus of claim 44, wherein the first SLSS comprises a sidelink primary synchronization signal (S-PSS), a sidelink secondary synchronization signal (S-SSS) and a physical sidelink broadcast channel (PSBCH), and wherein the first SLSS is based on a different repetition for at least one of the S-PSS, the S-SSS, or the PSBCH.

47. The apparatus of claim 44, wherein the first SLSS has a lower subcarrier spacing (SCS) than the second SLSS.

48. The apparatus of claim 44, wherein the first SLSS and the second SLSS are based on at least one different parameter, wherein the at least one different parameter comprises:
a periodicity,
a frequency location,
a frequency hopping pattern, and
a time domain location of a physical broadcast channels (PBCH) payload locations within a frame or within a sidelink synchronization signal block (S-SSB).

49. The apparatus of claim 44, wherein one of the first SLSS and the second SLSS is based on a synchronization raster, and wherein an other of the first SLSS and the second SLSS is at an offset to the synchronization raster.

50. An apparatus for wireless communication, comprising:
a memory; and
at least one processor coupled to the memory and configured to:
search for a first SLSS based on a first duration for an initial acquisition; and
search for a second SLSS based on a second duration for a refinement, wherein the first duration is longer than the second duration.

51. The apparatus of claim 50, wherein the first SLSS comprises more symbol repetitions than the second SLSS.

52. The apparatus of claim 50, wherein the first SLSS comprises a sidelink primary synchronization signal (S-PSS), a sidelink secondary synchronization signal (S-SSS) and a physical sidelink broadcast channel (PSBCH), and wherein the first SLSS is based on a different repetition for at least one of the S-PSS, the S-SSS, or the PSBCH.

53. The apparatus of claim 50, wherein the first SLSS has a lower subcarrier spacing (SCS) than the second SLSS.

54. The apparatus of claim 50, wherein the first SLSS and the second SLSS are based on at least one different parameter, wherein the at least one different parameter comprises:
a periodicity,
a frequency location,
a frequency hopping pattern, and
a time domain location of a physical sidelink broadcast channels (PSBCH) payload locations within a frame or within a sidelink synchronization signal block (S-SSB).

55. The apparatus of claim 50, wherein one of the first SLSS and the second SLSS is based on a synchronization raster, and wherein an other of the first SLSS and the second SLSS is at an offset to the synchronization raster.

56. A non-transitory computer-readable medium storing computer executable code, the code when executed by a processor cause the processor to:
search for a first SLSS based on a first duration for an initial acquisition; and
search for a second SLSS based on a second duration for a refinement, wherein the first duration is longer than the second duration.

* * * * *